(12) United States Patent
Ducos et al.

(10) Patent No.: US 7,007,891 B2
(45) Date of Patent: Mar. 7, 2006

(54) RETRACTABLE LANDING GEAR FOR AIRCRAFT

(75) Inventors: Dominique Ducos, Savigny-sur-Orge (FR); Jean-François Locufier, Rambouillet (FR)

(73) Assignee: Messier-Dowty SA, Velizy Villacoublay (FR)

( * ) Notice: Subject to any disclaimer, the term of this patent is extended or adjusted under 35 U.S.C. 154(b) by 54 days.

(21) Appl. No.: 10/880,466

(22) Filed: Jul. 1, 2004

(65) Prior Publication Data

US 2005/0011991 A1    Jan. 20, 2005

(30) Foreign Application Priority Data

Jul. 2, 2003    (FR) .................................. 03 08034

(51) Int. Cl.
*B64C 25/14*    (2006.01)

(52) U.S. Cl. ................................................ 244/102 R

(58) Field of Classification Search ............ 244/102 R, 244/102 A, 102 SS

See application file for complete search history.

(56) References Cited

U.S. PATENT DOCUMENTS

| 3,346,218 | A | * | 10/1967 | Lucien .................. 244/102 R |
| 3,653,682 | A |   | 4/1972  | Kobayashi, et al. |
| 4,199,119 | A | * | 4/1980  | Masclet ................ 244/102 SS |
| 4,422,604 | A | * | 12/1983 | Turiot et al. ............ 244/102 R |
| 4,681,284 | A | * | 7/1987  | Veaux et al. ............ 244/102 R |

FOREIGN PATENT DOCUMENTS

| EP | 0676328 A2 | 11/1995 |
| EP | 1279591 A1 | 1/2003 |

* cited by examiner

*Primary Examiner*—Robert P. Swiatek
(74) *Attorney, Agent, or Firm*—Sughrue Mion, PLLC (57) ABSTRACT

Retractable landing gear for an aircraft, the landing gear being of the type that is raised vertically, and comprising a plurality of independent legs, each leg comprising a structural part rigidly secured to a structure of the aircraft, a pivoting rocker beam supporting a pair of wheels, and a shock absorber. In accordance with the invention, the shock absorber of each leg is extended by a positioning portion enabling the total length of the extended shock absorber to be shortened in order to collapse the leg, and each leg further comprises a positioning actuator connected in hinged manner to the extended shock absorber and arranged to lengthen relative to a normal use position in order to lengthen the corresponding leg. This makes it possible to shorten and/or lengthen one or another of the legs of the landing gear while the aircraft is stationary or taxiing slowly.

10 Claims, 5 Drawing Sheets

RETRACTABLE LANDING GEAR FOR AIRCRAFT

FIELD OF THE INVENTION

The present invention relates to retractable landing gear for aircraft, the landing gear being of the type that is raised vertically and comprising a plurality of independent legs arranged one behind another so as to form, in the landing gear down position, a row that is parallel to the longitudinal midplane of the aircraft.

BACKGROUND OF THE INVENTION

Document EP-A-1 279 591 in the name of the Applicant illustrates landing gear of the above-specified type. Reference can also be made, for technological background, to document U.S. Pat. No. 3,653,682 which illustrates a device for absorbing energy comprising two superposed shock absorbers.

In certain situations, when the aircraft is stationary or taxiing slowly on the ground, it is desirable to be able to modify the attitude of the aircraft, i.e. the angle of inclination of its longitudinal axis and/or of its transverse axis.

In document U.S. Pat. No. 5,310,140 in the name of the Applicant, an approach is described which consists in modifying the length of the nosegear without altering the main landing gear. The structure of the shock absorber described in that document makes it easy to lengthen the landing gear when the aircraft is stationary or taxiing slowly, without requiring the hydraulic generator of the aircraft to be used, i.e. without requiring its engines to be in operation.

Document U.S. Pat. No. 5,310,139 in the name of the Applicant also shows a nosegear shock absorber designed to perform the same function.

The present invention relates more specifically to the shock absorbers fitted to wide-body aircraft main landing gear of the type that is retracted vertically, comprising a plurality of independent legs arranged one behind another to form, in the landing gear down position, a row that is parallel to the longitudinal plane of the airplane, with a pair of wheels being mounted at the end of each leg. Such retractable landing gear for wide-body aircraft is described, for example, in document EP-A-0 676 328 and EP-A-0 614 804 in the name of the Applicant.

In other situations, it is desired to shorten or lengthen one or more legs when the aircraft is stationary or taxiing slowly. Such shortening or lengthening can be advantageous not only when it is desired to modify the attitude of the aircraft while stationary, in particular while loading said aircraft, but also in other particular situations such as when changing a tire or when unloading the front leg in order to facilitate steering maneuvers. For tire changing, it is conventional to use jack systems for lifting the structure of the aircraft in order to lift the tire for replacement out of contact with the ground.

OBJECT OF THE INVENTION

An object of the invention is to devise retractable landing gear in which each leg is capable of combining both lengthening and shortening functions, and more particularly in an arrangement capable of providing a very long down stroke in order to enable the aircraft to be loaded regardless of the unevenness on the ground concerned, and also regardless of the type of carriage used, while also guaranteeing attitude and ground clearance that are as good as possible.

SUMMARY OF THE INVENTION

To solve this problem, the invention provides retractable landing gear for an aircraft, the landing gear being of the type that is raised vertically and comprising a plurality of independent legs arranged one behind another to form, in the gear-down position, a row parallel to the longitudinal midplane of the aircraft, each leg comprising a structural part rigidly secured to a structure of the aircraft, a rocker beam hinged to the bottom end of said structural part so that said rocker beam is movable in a vertical plane together with its pair of wheels, and a shock absorber associated with the rocker beam and comprising a main strut and a rod piston having one end slidably received in said main strut coaxially about the axis thereof, the landing gear being remarkable in that the shock absorber of each leg is extended by a positioning portion comprising a secondary strut sliding telescopically on the other end of the rod piston of said shock absorber, co-operating with the end wall of said rod piston to define a secondary hydraulic fluid chamber which is connected to an associated control circuit, thus enabling the total length of the extended shock absorber to be shortened in order to collapse said leg, and in that each leg further includes a positioning actuator connected in hinged manner to the extended shock absorber, being arranged so that the assembly constituted by said positioning actuator and said extended shock absorber is interposed between an appendix of the rocker beam and at least one moving element forming part of the control rodding of the landing gear, a link rod also being interposed between the rocker beam and the hinged zone between the positioning actuator and the extended shock absorber, said positioning actuator being arranged to lengthen relative to a normal use position in order to lengthen the corresponding leg.

Such an arrangement makes it possible not only to provide the conventional shock absorbing function, but also to provide two positioning functions, by providing an aircraft-lowering or "collapsing" stroke and an aircraft-raising or "lifting" stroke in compliance with the problem posed.

In a particular embodiment, the extended shock absorber is interposed between the link rod and the moving rodding element, and the positioning actuator is interposed between the link rod and the appendix of the rocker beam.

In a variant, provision could be made for the extended shock absorber to be interposed between the link rod and the appendix of the rocker beam, and for the positioning actuator to be interposed between the link rod and the moving rodding element.

Provision can also be made for the link rod to be fastened to an intermediate appendix of the rocker beam situated between the hinge axis of the rocker beam and the appendix of said rocker beam on which the extended shock absorber or the positioning actuator is hinged.

In particular, the link rod may be a bell-crank having three distinct hinge points, with the first hinge point being associated with the extended shock absorber, the second hinge point being associated with the positioning actuator, and the third hinge point being associated with the intermediate appendix of the rocker beam. The rocker beam may also be bent into a V-shape with a downwardly-directed tip, and the intermediate appendix of the rocker beam may be arranged inside said tip.

In accordance with another advantageous characteristic of the invention, in the maximally-shortened position of the extended shock absorber due to the rod piston entering into the secondary strut, said secondary strut comes into abutment against the main strut, thereby guaranteeing predetermined ground clearance for the aircraft in the maximally-collapsed position of the corresponding landing gear legs.

Also advantageously, the maximally-lengthened position of the positioning actuator due to the rod of the actuator being extended from the body of said actuator, control abutment takes place, thereby guaranteeing that the lengthened position of the corresponding landing gear leg is constant.

It is also advantageous to make provision for the extended shock absorbers of said landing gear to have control circuits arranged to enable selective individual control or group control of the shortening of said shock absorbers. Similarly, it is advantageous to make provision for the positioning actuators of said landing gear to have control circuits arranged to enable selective individual control or group control of the lengthening of said actuators.

Other characteristics and advantages of the invention will appear more clearly in the light of the following description relating to a particular embodiment.

BRIEF DESCRIPTION OF THE DRAWINGS

Reference is made to the figures of the accompanying drawings, in which.

DETAILED DESCRIPTION OF THE INVENTION

FIGS. 1 and 3 to 5 show landing gear 100 constituting main landing gear of the type comprising independent legs that can be raised vertically.

Specifically, the landing gear is for a wide-body airplane and comprises a plurality of legs 101 arranged one behind another so as to form, in the gear-down position (the position shown in FIG. 1) a row that is parallel to the longitudinal midplane of the aircraft. Specifically, this main landing gear comprises three independent legs 101, but this is merely by way of example. Each leg 101 comprises a structural part 102 that is rigidly secured to a structure of the aircraft, and a rocker beam 103 hinged to the bottom end 104 of said structural part about a transverse axis referenced Y. The structural part 102 may be of any type that is conventional in this field, for example it may be triangular in shape with an upwardly-directed tip, the tip of the triangle corresponding to fastening to the aircraft structure about a transverse axis X, and the base of the resulting triangle then being situated at the level of the hinge axis Y of the rocker beam 103. Each rocker beam 103 fitted with a pair of wheels R can thus be moved in a vertical plane and can pivot about the above-mentioned axis Y which is perpendicular to the longitudinal midplane of the aircraft.

Figure 1:
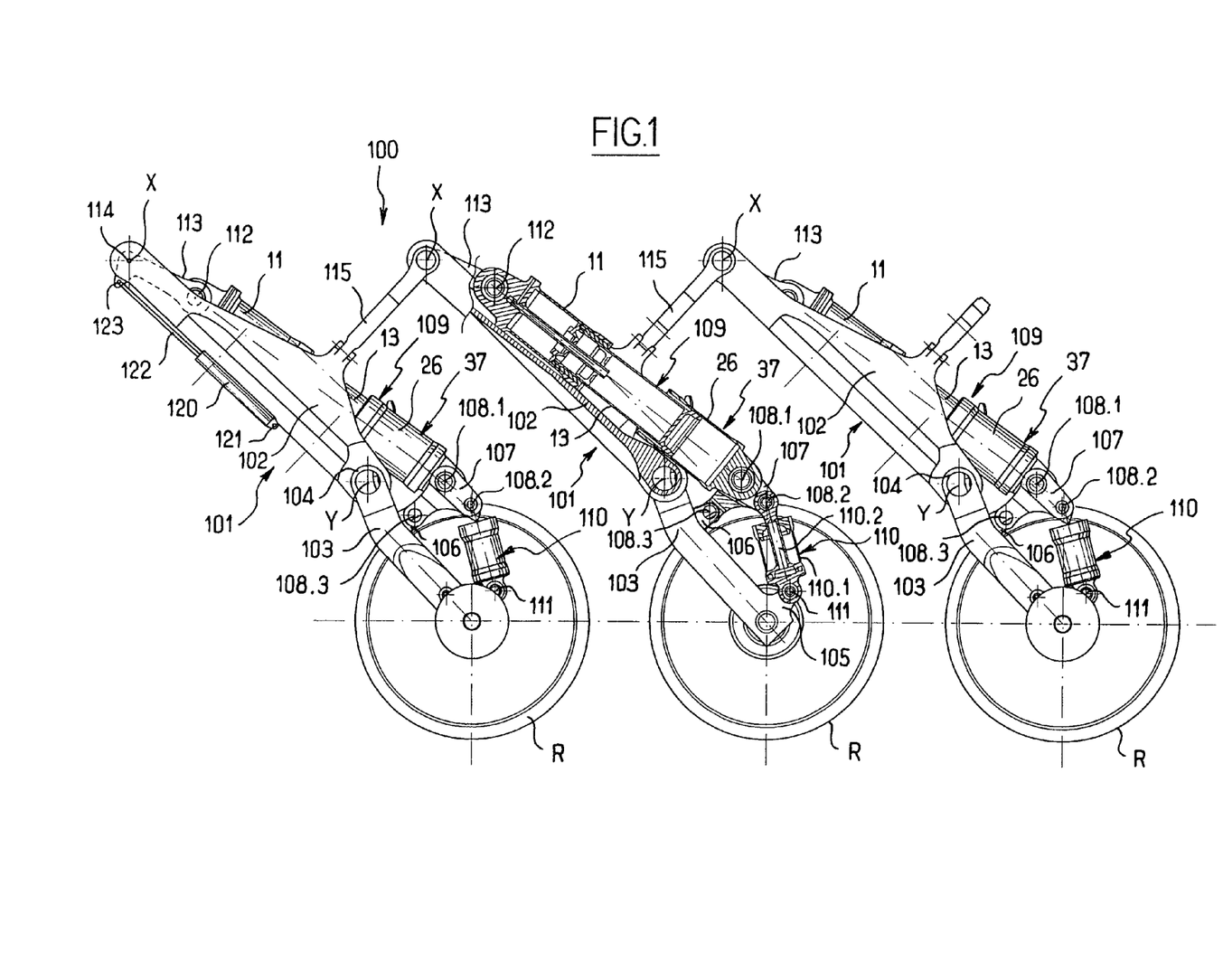
FIG. 1 shows landing gear in accordance with the invention, in this case having three independent legs, each of which is fitted with a hinged assembly comprising an extended shock absorber and a positioning actuator, the position shown being the gear-down position.

The landing gear shown herein is also reinforced by structural parts 115, e.g. in the form of a rectangular or triangular panel presenting a recess for passing the hinged assembly constituted by an extended shock absorber and a positioning actuator, which assembly is described in greater detail below. Stiffening rods (not shown herein) are generally provided to connect the top ends of the structural parts 102 to the structural parts 115.

Each leg 101 also includes a shock absorber 109 presenting a main strut 11 and a rod piston 13 having one end sliding in said main strut along the axis thereof.

In accordance with a characteristic of the invention, the shock absorber 109 of each leg 101 is extended by a positioning portion 37 comprising a secondary strut 26 that slides telescopically on the other end of the rod piston 13 of said shock absorber, co-operating with the end of said rod piston to define a secondary hydraulic fluid chamber which is connected to an associated control circuit, thus enabling the total length of the extended shock absorber 109 to be shortened so as to collapse the corresponding leg 101.

Figure 4:
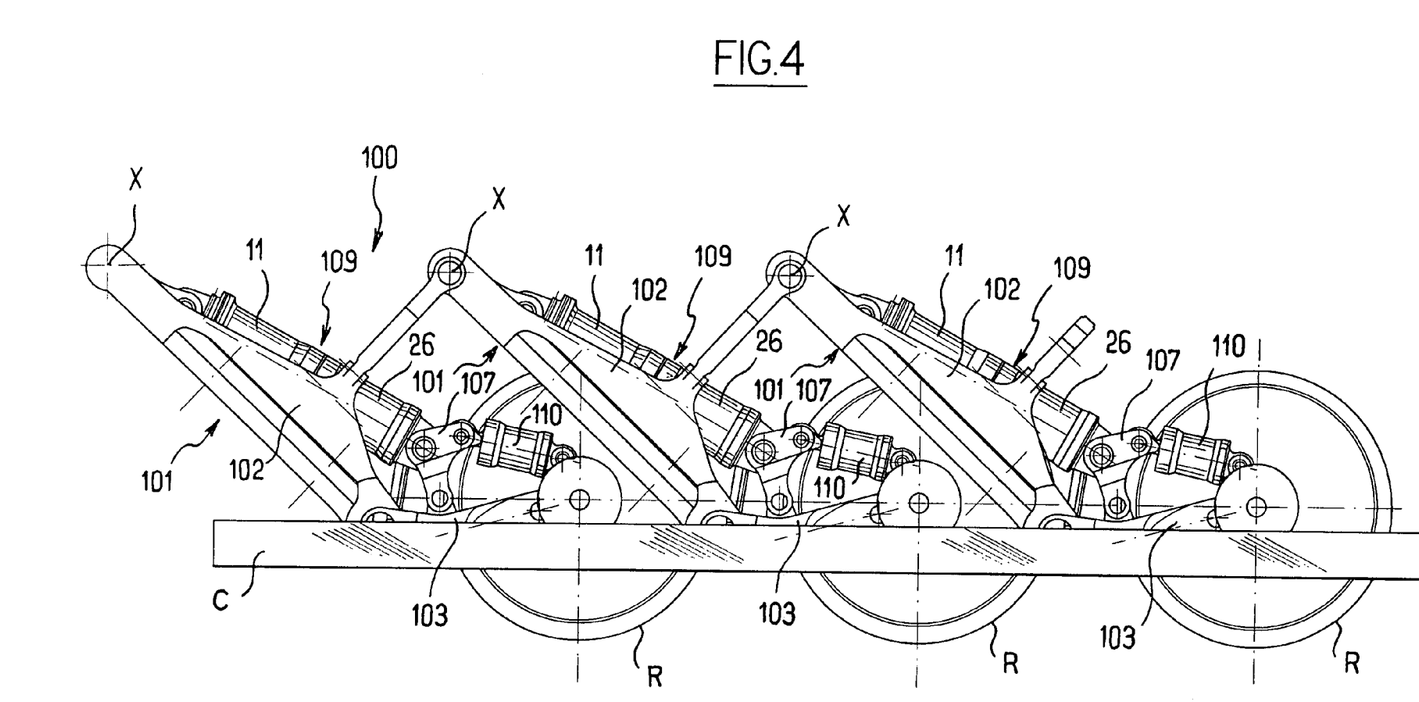
FIG. 4 shows the above landing gear in the gear-down position, with each of the legs being shortened as much as possible, thus showing a position in which said landing gear is collapsed as much as possible.

In FIG. 1, which shows the gear-down position with the shock absorber fully extended for each leg 101, there can thus be seen the three main components of the extended shock absorber 109, namely: the main strut 11, the rod piston 13, and the secondary strut 26. The three components 11, 13, and 26 of each extended shock absorber 109 can also be seen in FIG. 3. In FIG. 4, it is of interest to observe that the rod piston 13 of each extended shock absorber 109 cannot be seen. This illustrates an advantageous characteristic which is returned to below, whereby, in the maximally collapsed position relative to the fairing C as shown in FIG. 4, which corresponds to the position of maximum shortening of the extended shock absorber by retracting the rod piston into the secondary strut, the secondary strut 26 comes into abutment against the main strut 11. This positive abutment for each extended shock absorber 109 guarantees predetermined ground clearance for the aircraft in the maximally-collapsed position of the legs in the landing gear concerned. Finally, in FIG. 5, all three components 11, 13, and 26 can again be seen for each of the extended shock absorbers 109.

In FIG. 1, the hinged assembly constituted by the extended shock absorber 109 and the positioning actuator 110 is shown in section for the middle landing gear leg. The particular structure of the extended shock absorber 109 will nevertheless be better understood with reference to the section of FIG. 2 which is described below in greater detail.

Figure 2:
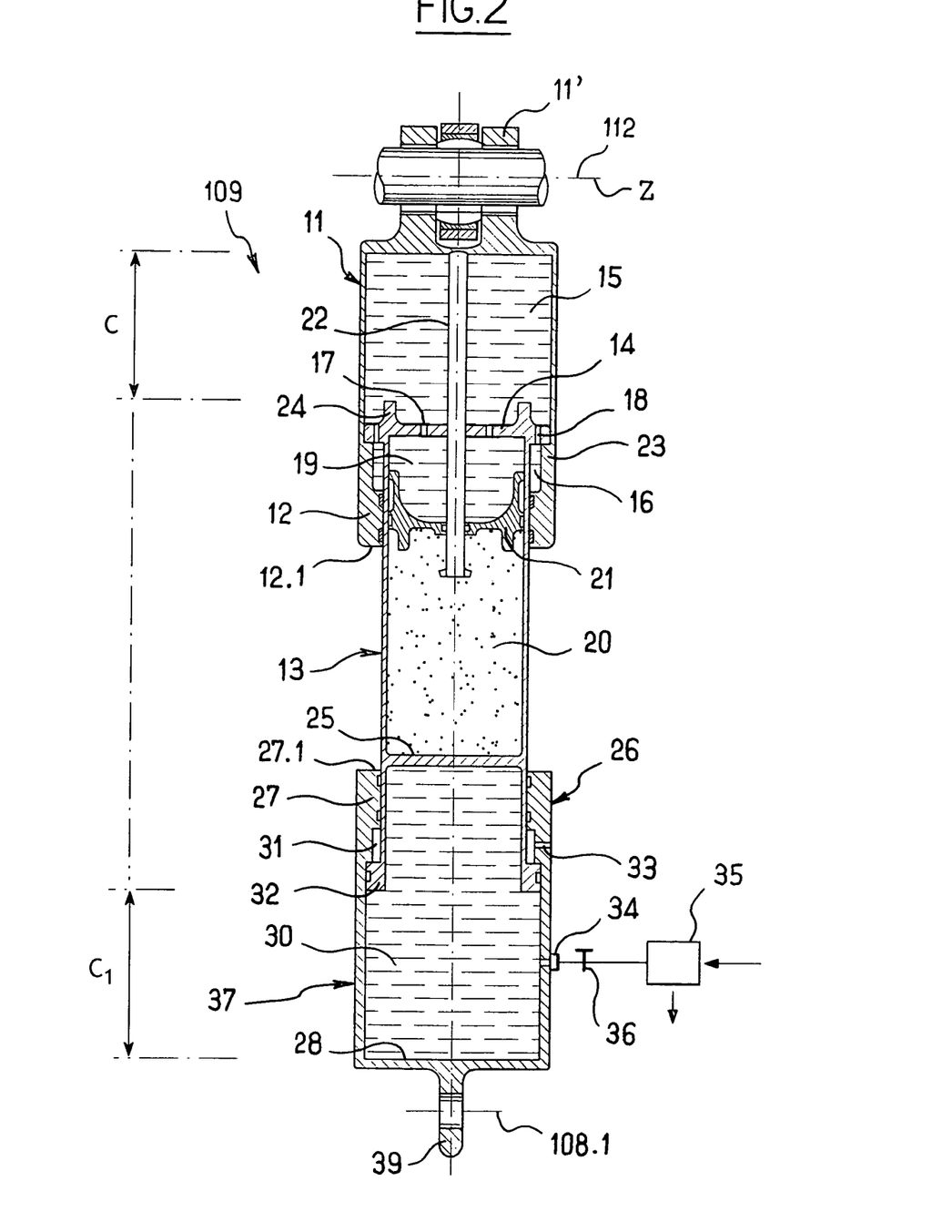
FIG. 2 is an axial section on a larger scale through an extended shock absorber as fitted to each of the independent legs in the above landing gear.
Figure 3:
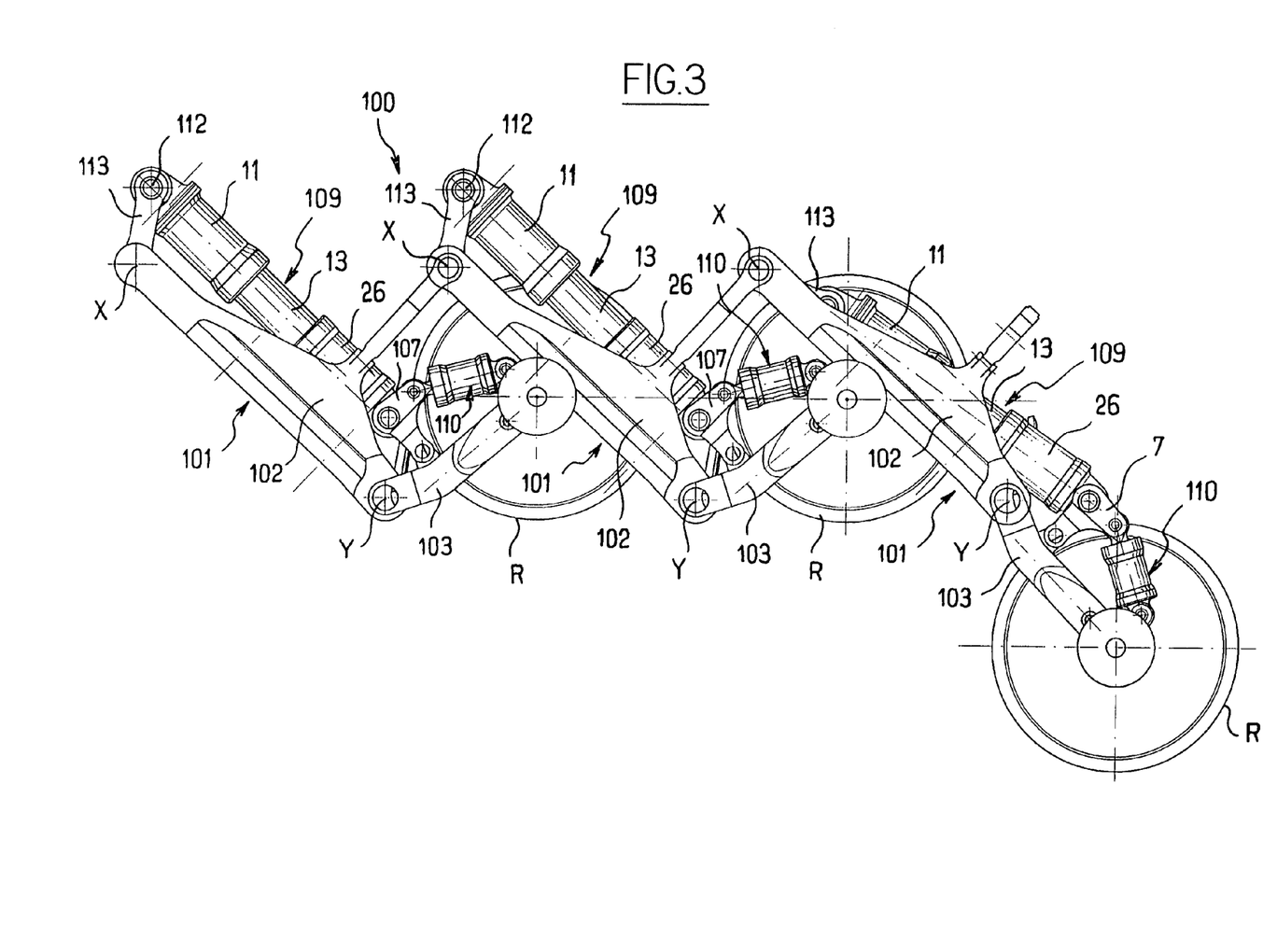
FIG. 3 shows the FIG. 1 landing gear in the gear-up position for its front two legs and in the gear-down position for its rear leg.

The top portion of the shock absorber 109 shown in FIG. 2 (top in the drawing but not necessarily in reality), i.e. the portion which is dedicated to the conventional function of absorbing shock and vibration, is of conventional structure. There can thus be seen a main strut 11 having lugs 11' for hinging about a pin 112 extending transversely to the longitudinal midplane of the aircraft. A rod piston 13 is also provided, having a top end slidably received in the main strut 11 coaxially about the central axis of the strut. The end wall 14 of the rod piston 13 co-operates with the main strut 11 to define a main hydraulic fluid chamber 15, and an annular hydraulic fluid chamber 16 communicating with said main chamber via an associated diaphragm 18. The rod piston 13 also presents internally two adjacent chambers 19 and 20 that are isolated from each other by a separator piston 21, one of the chambers 19 containing hydraulic fluid and in communication with the main chamber 15 via an associated diaphragm 17 formed in the transverse wall 14 of the rod piston 13, and the other chamber 20 containing gas under pressure. The corresponding end of the rod piston 13 thus slides telescopically in the enlarged bottom portion 12 of the main strut 11.

The position shown in FIG. 2 corresponds to a maximally-extended position in which the end wall 14 comes into abutment against an associated shoulder 23 of the main strut 11. The maximally-retracted position of the rod piston 13 within the main strut 11 is given by projections 24 formed on the wall 14 coming into abutment against the end wall of said main strut 11. A central filler tube 22 is provided to enable the chamber 20 containing gas under pressure to be filled initially. The chamber 20 containing gas under pressure is thus defined by the separator piston 21 at one end, and by a terminal transverse partition 25 constituting the end wall of the rod piston 13 at its other end. This top portion of the shock absorber, which is of conventional design, performs the usual function of absorbing shock and vibration.

The bottom portion of the shock absorber 109 is described below, which portion is associated with the two positioning functions for the associated leg.

The rod piston 13 extends beyond its end wall 25 so as to present an extension on which another strut referenced 26 can slide, constituting a secondary strut. This secondary strut 26 thus has an enlarged end 27 which slides telescopically on the bottom end of the rod piston 13, co-operating with the end wall 25 of said rod piston to define a secondary hydraulic fluid chamber 30. The secondary strut 26 presents at its other end an end wall 28 that co-operates with the end wall 35 to define the above-mentioned secondary chamber 30. The secondary hydraulic fluid chamber 30 is closed by an associated hydraulic locking member 36. In addition, the top portion 27 of the secondary strut 26 co-operates with the bottom portion 32 of the rod piston 13 to define an annular secondary chamber 31 which is permanently connected to the atmosphere via an associated open channel 33.

The secondary hydraulic fluid chamber 30 is connected to an associated control circuit constituted by a communication valve 34 fixed through the wall of the strut 26 and connected to a controlling solenoid valve 35. The hydraulic locking member 36 is in this case tapped though the above-mentioned control members, but it would naturally be possible to provide a locking member arranged at some other point, e.g. through the end wall 28 of the secondary strut 26.

Thus, by actuating the controlling solenoid valve 35 and the hydraulic lock 36, it is possible to act on the volume of the secondary chamber 30. This makes it possible to cause the secondary strut 36 to move relative to the remaining portion of the shock absorber 109.

In the position shown in FIG. 2, the hydraulic fluid chamber 30 presents a maximum volume, which corresponds to a maximum length for the extended shock absorber 109. The corresponding positioning portion 37 is then in its position that is furthest from the primary strut 11. If it is desired to collapse the corresponding landing gear leg, it suffices to act on the hydraulic lock 36 to allow hydraulic fluid to flow from the chamber 30, with this flow taking place naturally given that the shock absorber is subjected to the static load of the aircraft. This exit of hydraulic fluid is accompanied by the rod piston 13 entering progressively into the inside of the secondary strut 26, and consequently to the total length of the extended shock absorber 109 shortening. Subsequently, when it is desired to return to the initial position (shown in FIG. 2), it suffices to refill the hydraulic chamber 30 by acting on the controlling solenoid valve 35.

Provision could be made for the above-described retraction and shortening movement to be continued until the enlarged portion 32 of the rod piston 13 comes into abutment against the end wall 28 of the secondary strut 26. Nevertheless, in accordance with an advantageous characteristic of the invention, a different abutment system is provided in this case.

In the maximally-shortened position of the extended shock absorber 109 following retraction of the rod piston 13 into the secondary strut 26, provision is made for the secondary strut 26 to come into abutment against the main strut 11. This means that the free edge 27.1 of the end 27 of the secondary strut 26 comes into contact in this position with the free edge 12.1 of the end 12 of the main strut 11. This is very advantageous in practice insofar as such a positive abutment makes it possible to guarantee predetermined ground clearance for the aircraft in the maximally-collapsed position of the corresponding landing gear leg. Because of this abutment contact, when the aircraft is being loaded, there is no risk of it sinking any further, such that the attitude of the aircraft remains constant. Ground clearance is guaranteed, and it is quite certain that the fairings of the aircraft will not come into contact with the ground when the aircraft is maximally loaded. Naturally, in the absence of such abutments, there would be a significant risk of the wheel continuing to subside.

In FIG. 2, reference c designates the stroke of the shock absorber that corresponds to the distance between the projections 24 and the end wall of the main strut 11, and reference $c_1$ designates the maximum collapsing stroke which corresponds to the stroke of the end 32 of the rod piston 13 between the top shoulder 33 of the secondary strut 26 and the end wall 28 of said secondary strut.

In accordance with another characteristic of the invention, each leg 101 further includes a positioning actuator 110 which is hinged to the extended shock absorber 109, being arranged in such a manner that the assembly constituted by said positioning actuator and said extended shock absorber is interposed between an appendix 105 of the rocker beam 103 and at least one moving element 113 forming part of the control rodding of the landing gear. Specifically, the above-mentioned moving element 113 is the arm of a lever which is hinged at 114 to the structural part 102, and whose other arm 123 serves to fasten the rod 122 of the leg-raising actuator 120 (shown only for the front leg in FIG. 1), whose cylinder is hinged at 121 to the structural part 102.

The particular control rodding of the landing gear shown herein naturally constitutes merely an example in the context of the invention, the novel characteristic lying in the hinged assembly constituted by the combined arrangement of the extended shock absorber 109 and the positioning actuator 110.

A link rod 107 is also interposed between the rocker beam 103 and the hinge zone between the positioning actuator 110 and the extended shock absorber 109.

Specifically, the link rod 107 is a bell-crank having three distinct hinge points referenced 108.1, 108.2, and 108.3. The first hinge point 108.1 is associated with the extended shock absorber 109, the second 108.2 is associated with the positioning actuator 110, and the third 108.3 is associated with an intermediate appendix 106 of the rocker beam 103. Provision can naturally be made in a variant for the link rod 107 to be straight having two hinge points, by grouping together the hinges 108.1 and 108.2 on a common transverse axis. Such a design might appear to be simpler, but it involves the loss of swiveling on one element, while the three-point arrangement shown herein makes it possible to avoid slicing forces at the extended shock absorber and at the positioning actuator.

The positioning actuator 110 is thus hinged between a point 111 of the terminal appendix 105 of the rocker beam 103 and the hinge point 108.2 of the bell-crank 107. It should be observed that the positioning actuator 110 of each leg constitutes a separate component that can be individually removed, which is very advantageous in practice.

The positioning actuator 110 is a hydraulic actuator whose body is referenced 110.1, and whose rod is referenced 110.2. Provision could be made to fit the positioning actuator with hydraulic or mechanical type locking members in order to avoid any risk of the shock absorber relaxing in the event of hydraulic fluid leaking.

Figure 5:
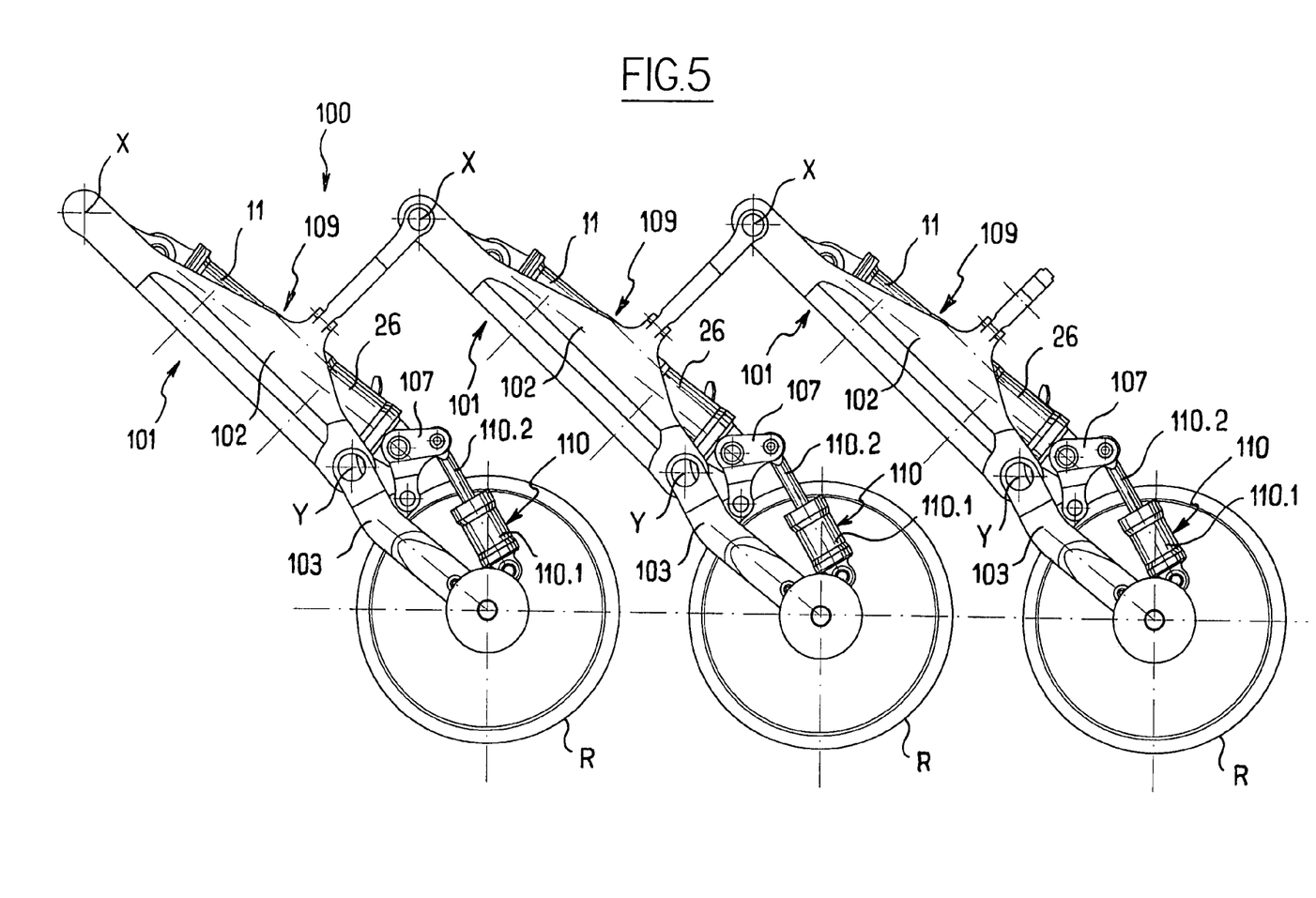
FIG. 5 shows the same landing gear with the leg positioning actuators in a state of maximum extension, thus showing a position of maximum lift for the legs of the landing gear.

As can easily be understood, extending the rod 110.2 of the positioning actuator 110 out from the body 110.1 of said actuator causes the positioning actuator to lengthen relative to a normal position of use, which lengthening corresponds to raising the corresponding leg 101. With reference to FIG. 5, such a raised position of the landing gear can be seen, in which each leg presents a shock absorber that is compressed under static load, and a positioning shock absorber that is in its maximally-extended state. A control abutment preferably takes place in the maximally-lengthened position of the positioning actuator 110 due to the rod 110.2 being extended from the body 110.1 of said actuator, thereby ensuring that the lifting position of the corresponding landing gear leg is constant. It should be observed that it would be easy in this maximally-lifted position, to extract a wheel with a punctured tire, and that is not possible with the above-mentioned prior art systems.

By way of indication, it would be possible to make a hinged assembly comprising an extended shock absorber 109 and a positioning actuator 110 providing a wheel center stroke of 600 millimeters (mm), a collapsing stroke (sometimes referred to as "kneeling") of 570 mm, and a lifting stroke of at least 240 mm. Such a triple-function hinged assembly thus makes it possible for the landing gear leg not only to perform the required shock absorber function, which is performed conventionally, but also the two positioning functions of collapsing and lifting.

In the particular embodiment shown herein, and as described above, the extended shock absorber 109 is interposed between the link rod 107 and the moving rodding element 113, and the positioning actuator 110 is interposed between the link rod 107 and the appendix 105 of the rocker beam 103. It would nevertheless be possible to envisage another variant, not shown herein, in which the extended shock absorber 109 is interposed between the link rod 107 and the appendix 105 of the rocker beam 103, while the positioning actuator 110 is interposed between the link rod 107 and the moving rodding element 113.

Furthermore, provision is made for the link rod 107 to be fastened in this case to the intermediate appendix 106 of the rocker beam 103, but it would also be possible in a variant to provide for this link rod to be fastened to the rocker beam via its hinge axis Y.

The rocker beam 103 is shown herein as being bent in a V-shape with its tip pointing downwards, the intermediate appendix 106 of the rocker beam 103 being arranged inside said tip. In a variant, provision could be made for the rocker beam to be essentially rectilinear, from its hinge axis Y to the terminal appendix 105 of said rocker beam having the shock absorber 109 or the positioning actuator 110 hinged thereto.

Finally, it will be advantageous to provide for the extended shock absorbers 109 of the landing gear to have control circuits 34, 35 arranged to enable said shock absorbers to be shortened as a group, or to enable a selected shock absorber to be shortened individually.

Similarly, provision could be made for the positioning actuators 110 of the landing gear to have control circuits (not shown herein) that are arranged to enable a selected individual actuator to be lengthened or to enable said actuators to be lengthened as a group.

The invention is not limited to the embodiments described above, but on the contrary covers any variant using equivalent means to reproduce the essential characteristics specified above.

In particular, it is possible to use an electrical generator to control collapsing and/or lifting and/or locking.

Provision could also be made at the bottom portion of each structural part 102, in the vicinity of the axis Y, for an angular abutment (not shown herein) against which the associated rocker beam would come into abutment in the maximally-lifted position, thus making it possible to cope with a breakdown of the means for locking the positioning actuator.

What is claimed is:

1. Retractable landing gear for an aircraft, the landing gear being of the type that is raised vertically and comprising a plurality of independent legs arranged one behind another to form, in the gear-down position, a row parallel to the longitudinal midplane of the aircraft, each leg comprising a structural part rigidly secured to a structure of the aircraft, a rocker beam hinged to the bottom end of said structural part so that said rocker beam is movable in a vertical plane together with its pair of wheels, and a shock absorber associated with the rocker beam and comprising a main strut and a rod piston having one end slidably received in said main strut coaxially about the axis thereof, wherein the shock absorber of each leg is extended by a positioning portion comprising a secondary strut sliding telescopically on the other end of the rod piston of said shock absorber, co-operating with the end wall of said rod piston to define a secondary hydraulic fluid chamber which is connected to an associated control circuit, thus enabling the total length of the extended shock absorber to be shortened in order to collapse said leg, and wherein each leg further includes a positioning actuator connected in hinged manner to the extended shock absorber, being arranged so that the assembly constituted by said positioning actuator and said extended shock absorber is interposed between an appendix of the rocker beam and at least one moving element forming part of the control rodding of the landing gear, a link rod also being interposed between the rocker beam and the hinged zone between the positioning actuator and the extended shock absorber, said positioning actuator being arranged to lengthen relative to a normal use position in order to lengthen the corresponding leg.

2. Landing gear according to claim 1, wherein the extended shock absorber is interposed between the link rod and the moving rodding element, and the positioning actuator is interposed between the link rod and the appendix of the rocker beam.

3. Landing gear according to claim 1, wherein the extended shock absorber is interposed between the link rod and the appendix of the rocker beam, and the positioning actuator is interposed between the link rod and the moving rodding element.

4. Landing gear according to claim 1, wherein the link rod is fastened to an intermediate appendix of the rocker beam situated between the hinge axis of the rocker beam and the appendix of said rocker beam on which the extended shock absorber or the positioning actuator is hinged.

5. Landing gear according to claim 4, wherein the link rod is a bell-crank having three distinct hinge points, with the first hinge point being associated with the extended shock absorber, the second hinge point being associated with the positioning actuator, and the third hinge point being associated with the intermediate appendix of the rocker beam.

6. Landing gear according to claim 4, wherein the rocker beam is bent into a V-shape with a downwardly-directed tip, and the intermediate appendix of the rocker beam is arranged inside said tip.

7. Landing gear according to claim 1, wherein, in the maximally-shortened position of the extended shock absorber due to the rod piston entering into the secondary strut, said secondary strut comes into abutment against the main strut, thereby guaranteeing predetermined ground clearance for the aircraft in the maximally-collapsed position of the corresponding landing gear legs.

8. Landing gear according to claim 1, wherein, in the maximally-lengthened position of the positioning actuator due to the rod of the actuator being extended from the body of said actuator, control abutment takes place, thereby guaranteeing that the lengthened position of the corresponding landing gear leg is constant.

9. Landing gear according to claim 1, wherein the extended shock absorbers of said landing gear have control circuits arranged to enable selective individual control or group control of the shortening of said shock absorbers.

10. Landing gear according to claim 1, wherein the positioning actuators of said landing gear have control circuits arranged to enable selective individual control or group control of the lengthening of said actuators.

* * * * *